United States Patent
Kajiyama et al.

(10) Patent No.: US 9,244,311 B2
(45) Date of Patent: *Jan. 26, 2016

(54) PHOTO-ALIGNMENT EXPOSURE METHOD AND PHOTO-ALIGNMENT EXPOSURE DEVICE

(71) Applicant: V TECHNOLOGY CO., LTD., Kanagawa-ken (JP)

(72) Inventors: Koichi Kajiyama, Kanagawa (JP); Kazushige Hashimoto, Kanagawa (JP); Toshinari Arai, Kanagawa (JP)

(73) Assignee: V TECHNOLOGY CO., LTD., Yokohama-shi, Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/412,898

(22) PCT Filed: Mar. 29, 2013

(86) PCT No.: PCT/JP2013/059576
§ 371 (c)(1),
(2) Date: Jan. 5, 2015

(87) PCT Pub. No.: WO2014/006943
PCT Pub. Date: Jan. 9, 2012

(65) Prior Publication Data
US 2015/0192830 A1    Jul. 9, 2015

(30) Foreign Application Priority Data
Jul. 5, 2012  (JP) ................... 2012-151629

(51) Int. Cl.
G02F 1/1337    (2006.01)

(52) U.S. Cl.
CPC .... G02F 1/133788 (2013.01); *G02F 1/133753* (2013.01); *G02F 2001/133757* (2013.01)

(58) Field of Classification Search
CPC ................. G03F 7/0005; G02F 1/133788
USPC .......................... 430/321; 349/124
See application file for complete search history.

(56) References Cited

U.S. PATENT DOCUMENTS

2003/0072896 A1*  4/2003  Kwok et al. ................. 428/1.23
2012/0077351 A1   3/2012  Kajiyama et al.

FOREIGN PATENT DOCUMENTS

| JP | 2007-219191 A | 8/2007 |
| JP | 2008-020706 A | 1/2008 |
| JP | 2012-063652 A | 3/2012 |
| WO | 2010/140505 A1 | 12/2010 |

OTHER PUBLICATIONS

International Search Report issued in PCT/JP2013/059576 mailed on Jun. 25, 2013 (4 pages).

* cited by examiner

*Primary Examiner* — John A McPherson
(74) *Attorney, Agent, or Firm* — Osha Liang LLP

(57) ABSTRACT

A photo-alignment exposure method divides each unit image area of a liquid crystal display into a plurality of divided areas and photo-aligns an alignment material film of each of the divided areas in mutually different directions. The method includes a first exposure process that radiates light at an inclined photo-irradiation angle onto an exposed surface of entire the unit image area; and a second exposure process that radiates light onto one area of the divided areas at an inclined photo-irradiation angle different from the photo-irradiation angle in the first exposure process. In the second exposure process, the light is radiated through a mask pattern corresponding to one area of the divided areas, and transmitted light of the mask pattern is condensed by condensing element and radiated onto the area.

9 Claims, 7 Drawing Sheets

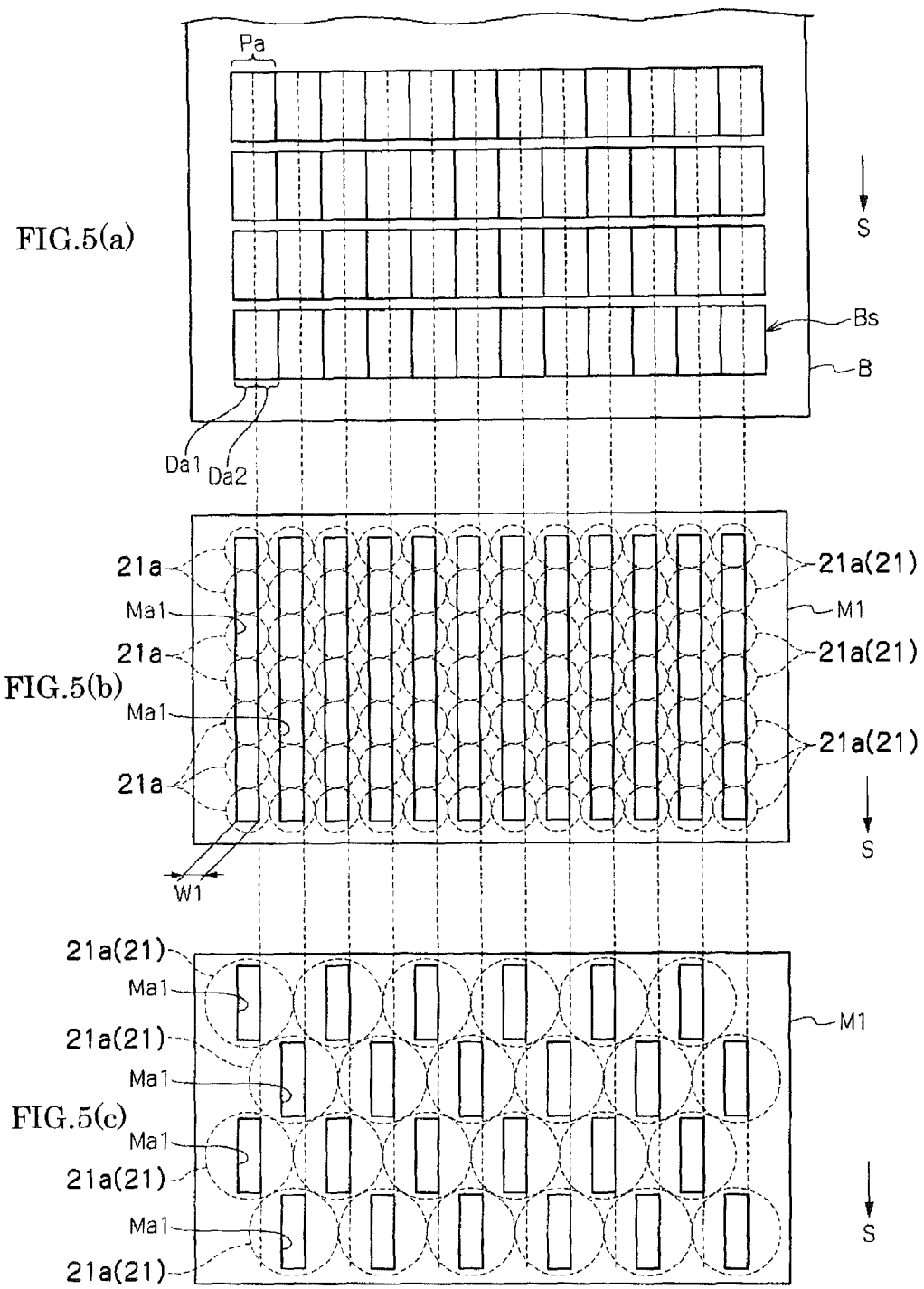

PHOTO-ALIGNMENT EXPOSURE METHOD AND PHOTO-ALIGNMENT EXPOSURE DEVICE

TECHNICAL FIELD

Embodiments of the invention relate to a photo-alignment exposure method and a photo-alignment exposure device that forms an alignment film of a liquid crystal display.

RELATED ART

A photo-alignment exposure system is known, in which a photosensitive polymeric membrane that is to serve as an alignment film is obliquely irradiated with light (an ultraviolet ray) in order to define the size of the pre-tilt angle and alignment direction of liquid crystal, as a system that forms an alignment film of a liquid crystal display.

Meanwhile, the viewing angle of a liquid crystal panel is modified by dividing a single unit image area (a pixel or a sub-pixel, or an aggregation area thereof) of a liquid crystal display into two or more areas and changing the alignment direction of the liquid crystal for each divided area, and this method is called a pixel division method or a multi-domain method.

When the aforementioned photo-alignment exposure system is used in the multi-domain method, a plurality of ultraviolet ray exposure light beams is formed to be radiated at different angles onto an exposed surface on an alignment material film, the ultraviolet ray is radiated from one direction through one opening of a mask onto one area obtained by dividing the unit image area, and the ultraviolet ray is radiated from another direction through another opening of the mask onto another area obtained by dividing the unit image area. As a result, the photo-alignment treatment with different pre-tilt angles and alignment directions can be performed with respect to each of a plurality of areas obtained by dividing the unit image area.

In this case, with the conventional technique described in Patent Literature 1, each of a plurality of linearly arranged unit image areas is divided into two areas by a dividing line extending along the arrangement direction, and the plurality of unit image areas is scanning exposed by moving the exposed surface along the arrangement direction of the unit image areas, thereby continuously performing the photo-alignment treatment with respect to the plurality of unit image areas. With such conventional technique, two mask patterns are used that have an opening pattern corresponding to one divided area and an opening pattern corresponding to another area adjacent thereto. Each opening pattern is irradiated with exposure light, ultraviolet ray exposure light, along the scanning direction at a different angle with respect to the exposed surface, and the mask pattern is projection exposed (proximity exposed) at the exposed surface, thereby performing the photo-alignment treatment in mutually different directions along the scanning direction with respect to two divided areas.

RELATED ART LITERATURE

Patent Literature

Patent Literature 1: Japanese Patent Application Publication No. 2012-63652

The exposure device used in the related art is provided, as depicted in FIG. 1(a), with a light source 1 emitting ultraviolet rays, a condenser lens 2 that converts the exposure light of the ultraviolet ray emitted from the light source 1 into parallel light and irradiates a mask M with the parallel light, and a fly-eye lens 3 (a lens array in which a plurality of unit lenses is arranged in a matrix configuration) that is disposed between the light source 1 and the condenser lens 2 and ensures uniform intensity distribution of the light radiated onto the mask M. The fly-eye lens 3 is arranged in a direction crossing the scanning direction S of an exposed surface Bs.

In such exposure device, as depicted in FIG. 1(b), a light L1 passing obliquely through the opening Ma of the mask M is generated by the condensing action of the fly-eye lens, and where this light L1 passes through the opening Ma of the mask M, the light is expanded by the collimation half-angle θ and the exposed surface Bs is irradiated thereby. As a result, in the exposed surface Bs, not only the area Me directly below the opening pattern of the mask M is irradiated, but the area outside the area Me is also irradiated by stray exposure light.

A photo-alignment exposure device such as depicted in FIG. 2(a) is used to perform the photo-alignment exposure by the multi-domain method with such an exposure device. In this case, a first mask M1 having an opening pattern that exposes one of the divided areas of the unit image area and a second mask M2 having an opening pattern that exposes the other divided area are disposed with a spacing from each other above the exposed surface Bs, and a first exposure device Ex1 and a second exposure device Ex2 are provided to expose the exposed surface Bs of the base plate B through the mask M1 and M2, respectively. The first exposure device Ex1 radiates ultraviolet ray exposure light, which is the exposure light along the scanning direction S, at an irradiation angle θe (for example, 40°) onto the exposed surface Bs of the base plate B, and the second exposure device Ex2 radiates ultraviolet ray exposure light, which is the exposure light along the scanning direction S, at an irradiation angle −θe (for example, −40°) onto the exposed surface Bs of the base plate B.

As a result, the exposure of divided areas Da1, Da2 in the single unit image area Pa is successively performed at an exposure intensity depicted in FIG. 2(b), and because of the stray exposure caused by the collimation half-angle depicted in FIG. 1(b), double exposure is performed in a range a close to the boundary of the divided areas Da1, Da2.

In this case, because the photoisomerization reaction is reversible in the alignment material, the correct photo-alignment can be obtained in the range a on a side of the divided area Da2, but the photo-alignment in the desired direction cannot be obtained in the area a1 of the range a on a side of the divided area Da1. The alignment disorder in the area a1 occurs due to the double exposure of insufficient intensity caused by the stray exposure resulting from the aforementioned collimation half-angle, and the width of the alignment disorder is about 10 μm to 15 μm. However, a transition to high-definition liquid crystal display panels created a demand for a smaller width of the unit image area Pa, and where a sufficient effective image area is to be ensured, such a width cannot be ignored.

SUMMARY OF THE INVENTION

One or more embodiments of the present invention eliminate the alignment disorder near the boundary of the divided areas, which are obtained by dividing a unit image area, and ensuring an effective image area sufficient to narrow the unit image area when the photo-alignment exposure system is used in the multi-domain method.

The photo-alignment exposure device and photo-alignment exposure method in accordance with one or more embodiments of the invention include at least the following features.

A photo-alignment exposure method and a photo-alignment exposure device by which each unit image area of a liquid crystal display is divided into a plurality of divided areas, and an alignment material film of each of the divided areas is photo-aligned in mutually different directions, in which when light is radiated at an inclined photo-irradiation angle onto an exposed surface, the light is radiated through a mask pattern onto one area of the divided areas, and transmitted light of the mask pattern is condensed by condensing element and radiated onto the divided areas which are the exposure objects. The condensing as referred to herein element condensing into the exposure object the light that spreads from the mask pattern into the areas outside the exposure object, and includes unmagnified projection, reduced projection, and magnified projection selected according to the dimensional relationship between the mask pattern and the area which is the exposure object.

According to such features, by condensing with the condensing element the light transmitted by the mask pattern and spread by the collimation half-angle, it is possible to suppress the spread and irradiate the exposed surface. As a result, the double-exposed area near the boundary of the divided areas can be reduced and the alignment disorder near the boundary of the divided areas can be eliminated.

With the photo-alignment exposure method and photo-alignment exposure device, the alignment disorder near the boundary of the divided areas obtained by dividing a unit image area can be eliminated and an effective image area sufficient to narrowing the unit image area can be ensured when the photo-alignment exposure system is used in the multi-domain method.

BRIEF DESCRIPTION OF THE DRAWINGS

FIG. 3(*a*) depicts a configuration example of the photo-alignment exposure device, and FIG. 3(*b*) depicts an example of a base plate (exposed surface).

FIGS. 5(*a*), 5(*b*) and 5(*c*) are an explanatory drawing illustrating examples of a mask and condensing element for use in the photo-alignment exposure method and photo-alignment exposure device according to one or more embodiments of the invention.

FIG. 6(*a*) is a cross-section in the direction crossing the scanning direction S, and FIG. 6(*b*) is a cross section taken along the scanning direction S.

FIG. 7(*a*) is a plan view, and FIG. 7(*b*) is sectional view taken along X-X in FIG. 7(*a*).

DETAILED DESCRIPTION

Figure 1A:
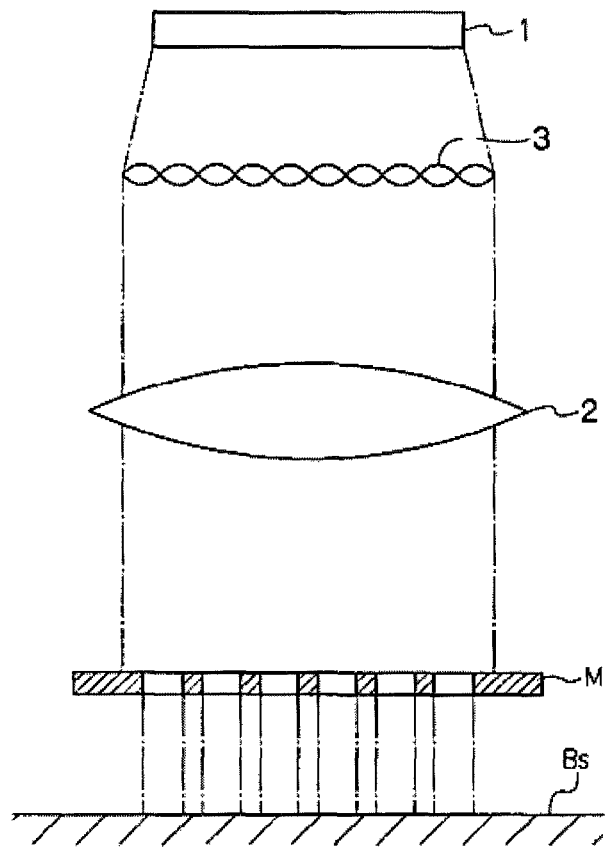
FIGS. 1(*a*) and 1(*b*) are an explanatory drawing illustrating the exposure device used in the related art.
Figure 1B:
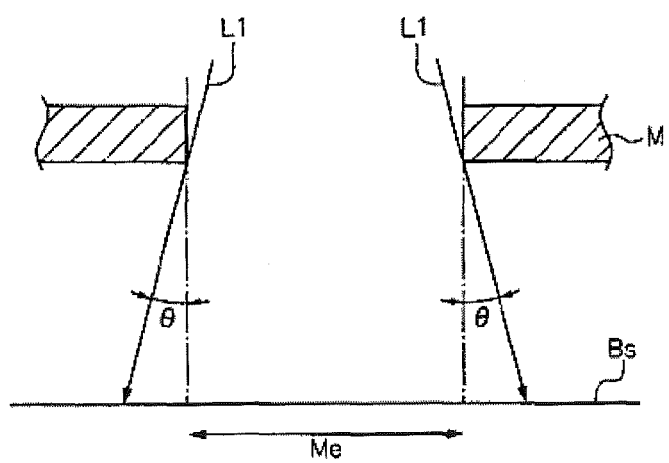
Figure 2A:
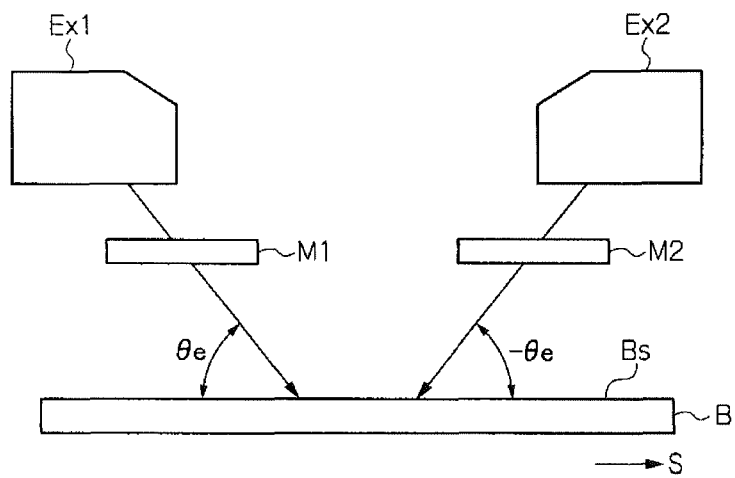
FIGS. 2(*a*) and 2(*b*) are an explanatory drawing illustrating the conventional photo-alignment exposure device.
Figure 2B:
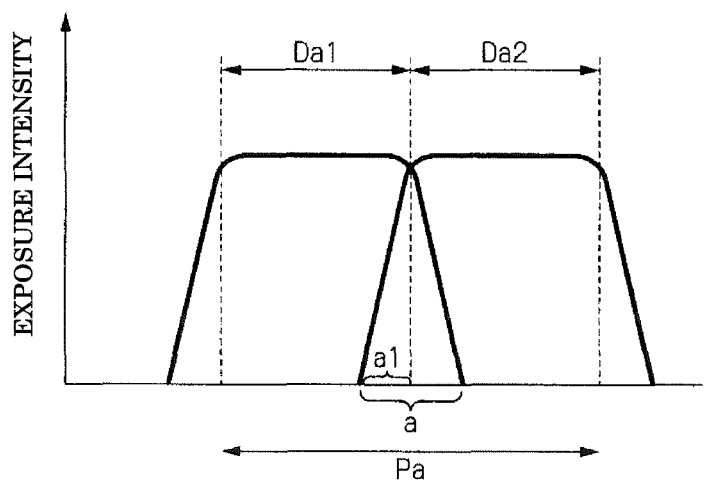
Figure 3A:
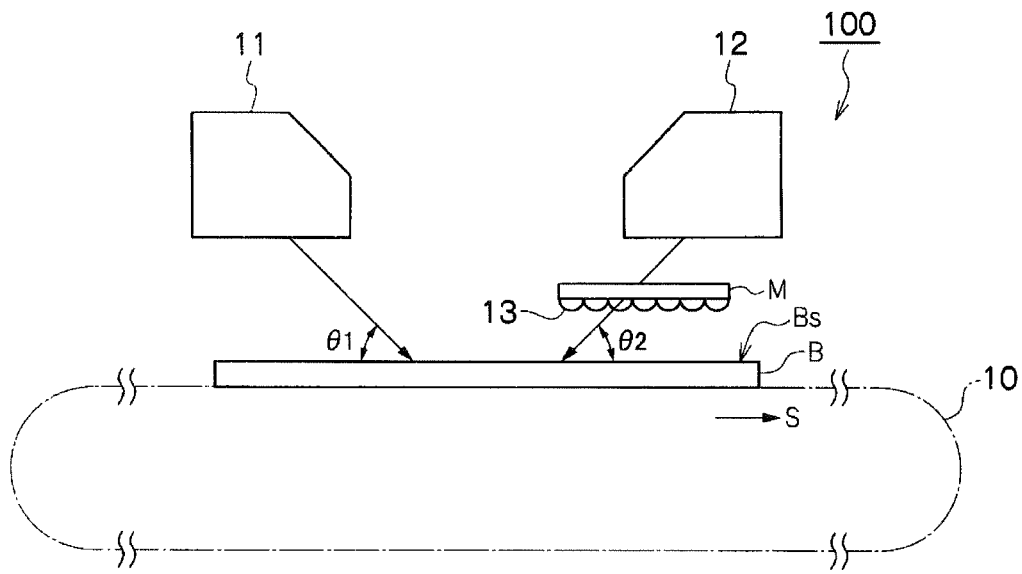
FIGS. 3(*a*) and 3(*b*) are an explanatory drawing illustrating the photo-alignment exposure method and photo-alignment exposure device according to one or more embodiments of the invention.
Figure 3B:
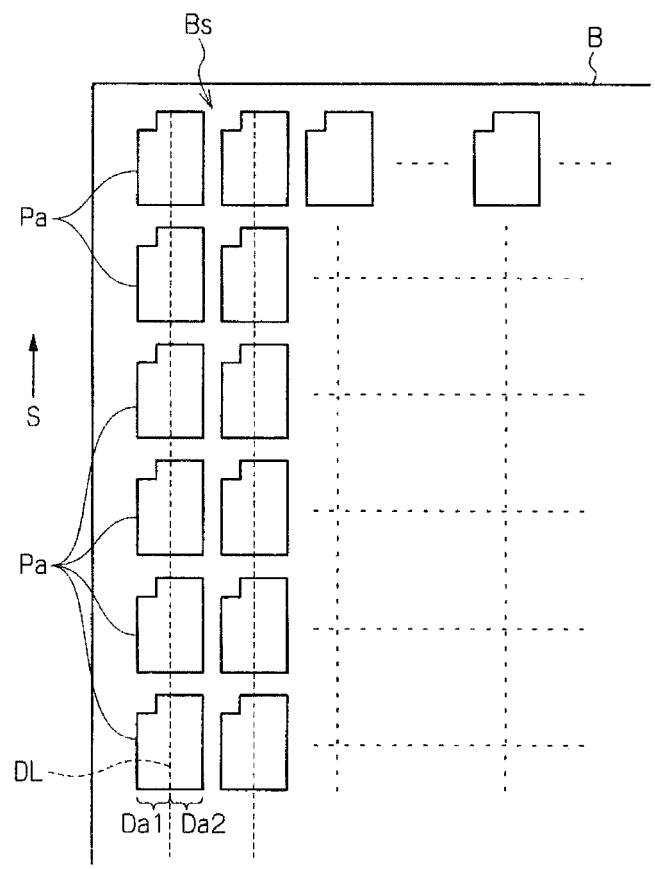

The embodiments of the present invention will be explained below with reference to the appended drawings. FIG. 3 is an explanatory drawing illustrating the photo-alignment exposure method and photo-alignment exposure device according to one embodiment of the present invention. FIG. 3(*a*) depicts a configuration example of the photo-alignment exposure device, and FIG. 3(*b*) depicts an example of a base plate (exposed surface).

As depicted in FIG. 3(*b*), a photo-alignment exposure device 100 is a device that divides each unit image area Pa of a liquid crystal display into a plurality of divided areas Da1, Da2, and photo-aligning an alignment material film of the respective divided areas Da1, Da2 in mutually different directions. The alignment material film referred to herein is a photosensitive polymeric membrane demonstrating a reversible photoisomerization reaction, and the alignment with the desired pre-tilt angle and in the direction along the radiation direction is obtained in reaction to the light (ultraviolet ray or the like) radiated obliquely onto the surface of the alignment material film. The unit image area Pa, as referred to herein, indicates a pixel, or a sub-pixel obtained by dividing the interior of one pixel into a plurality of colors (R, G, B), or an aggregation area thereof.

As depicted in FIG. 3(*a*), the photo-alignment exposure device 100 is provided with a first exposure device 11, a mask M, and a second exposure device 12. The first exposure device 11 executes the first exposure process of radiating light at an inclined photo-irradiation angle $\theta 1$ onto the exposed surface of the entire unit image area Pa. The mask M and the second exposure device 12 execute the second exposure process of exposing the second divided area Da2 which is adjacent to aforementioned first divided area Da1 which is one of the above-described divided areas. In the second exposure process, light is radiated at an inclined photo-irradiation angle $\theta 2$ which is different from the photo-irradiation angle $\theta 1$ in the first exposure process. The photo-irradiation angle $\theta 2$ in the second exposure process can be set, for example, as $\theta 2 = -\theta 1$.

The first exposure device 11 includes a light source radiating, for example, an ultraviolet ray and an optical system that radiates the light emitted from the light source at the inclination angle $\theta 1$ (for example 40°) onto an exposed surface Bs of a base plate B where the alignment material film has been formed. Similarly to the first exposure device 11, the second exposure device 12 is provided with a light source radiating, for example, an ultraviolet ray and an optical system that radiates the light emitted from the light source at the inclination angle $\theta 2$ ($=-\theta 1$) onto the exposed surface Bs.

The second exposure process is performed after the first exposure process, the light is radiated through the mask pattern of the mask M corresponding to the second divided area Da2, which is one of the divided areas, and the light transmitted by the mask pattern is condensed by condensing element 13 and radiated onto the second divided area Da2.

In the photo-alignment exposure device 100 provided with such a configuration, the entire surface of the unit image area Pa is photo-aligned in the first direction in the first exposure process performed by the first exposure device 11, and the second divided area Da2 is photo-aligned in the second direction in the second exposure process performed thereafter by the second exposure device 12. In this case, as a result of the alignment material film demonstrating a reversible photoisomerization reaction, only the above-mentioned exposed portion is photo-aligned in the second direction in the second exposure process, in which subsequent exposure is performed, and the portion that has not been exposed in the second exposure process, maintains the photo-alignment in the first direction.

Further, in the second exposure process the light transmitted by the mask pattern of the mask M is condensed by the condensing element 13 and the second divided area Da2 is exposed. Therefore, the light attempting to spread to the outside of the second divided area Da2 due to the aforementioned collimation half-angle θ can be condensed inside the second divided area Da2. Therefore, in the second exposure process, only the second divided area Da2 can be exposed at an intensity suitable for photo-alignment, without the light of insufficient intensity straying into the first divided area Da1. As a result, straying of light into another divided area and the exposure thereof are suppressed, and the alignment disorder occurring near the boundary of the divided areas can be eliminated.

The photo-alignment exposure device 100 according to the embodiment illustrated by FIG. 3 is explained hereinbelow in greater detail. The photo-alignment exposure device 100 according to the present embodiment is provided with base plate scanning part 10, and the base plate B having the unit image area Pa at the exposed surface Bs is moved by the base plate scanning part 10 along the scanning direction S. The scanning direction S is the arrangement direction of the plurality of unit image areas Pa which is along the dividing line DL.

The first exposure device 11 and the second exposure device 12 are disposed with a spacing from each other along the scanning direction S, and the first exposure process is performed on the upstream side in the scanning direction S, whereas the second exposure process is performed on the downstream side in the scanning direction S. The light beams radiated by the first exposure device 11 and the second exposure device 12 are radiated in the direction along the scanning direction S at different angles (θ1, θ2) onto the exposed surface Bs.

In the explanation hereinabove, the alignment material film is presumed to demonstrate a reversible photoisomerization reaction, but when the alignment material film demonstrates an irreversible photoisomerization reaction, the above-described second exposure process (the exposure of one area of the divided areas with the second exposure device 12 and the mask M) can be initially performed, and then the first exposure process (exposure of the entire unit image area with the first exposure device 11) can be performed.

Figure 4A:
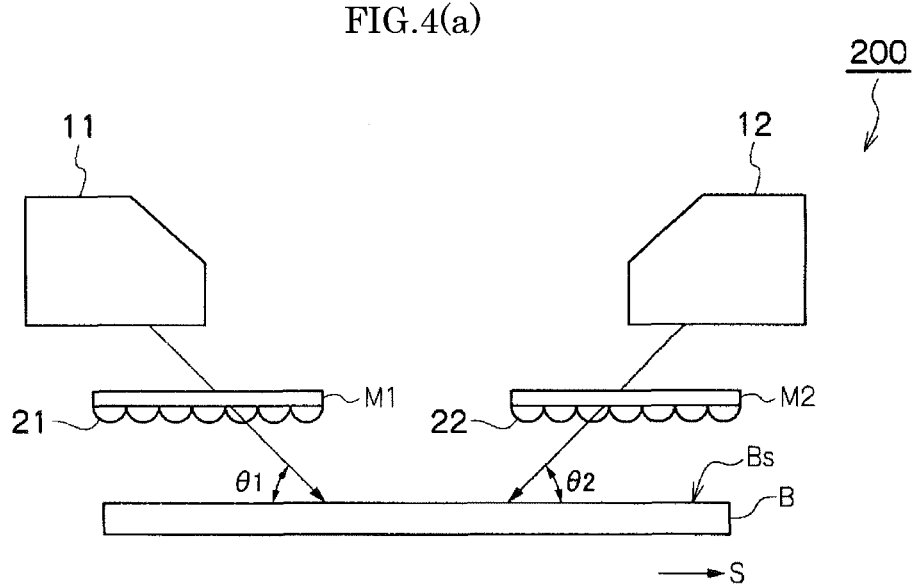
FIGS. 4(*a*) and 4(*b*) are an explanatory drawing illustrating the photo-alignment exposure method and photo-alignment exposure device according to one or more embodiments of the invention.

FIG. 4 is an explanatory drawing illustrating the photo-alignment exposure method and photo-alignment exposure device according to one or more embodiments of the invention. In the embodiment illustrated by FIG. 4(a), a photo-alignment exposure device 200 is provided with the first exposure device 11, a first mask M1, the second exposure device 12, and the second mask M2, condensing element 21 is provided between the first mask M1 and the exposed surface Bs, and second condensing element 22 is provided between the second mask M2 and the exposed surface Bs.

With the photo-alignment exposure device 200, a first exposure process is executed in which light (for example, an ultraviolet ray) is radiated at an inclined photo-irradiation angle θ1 by the first exposure device 11 onto one area (first divided area Da1) of the divided areas, and a second exposure process is executed in which light (for example, an ultraviolet ray) is radiated at an inclined photo-irradiation angle θ2 (=−θ1), which is different from the photo-irradiation angle in the first exposure process, by the second exposure device 12 onto the other divided area (second divided area Da2). In the first exposure process and second exposure process, light is radiated respectively through the first mask M1 and the second mask M2 having the mask patterns corresponding to the respective divided areas. Further, in the first exposure process and second exposure process, the transmitted light of the mask patterns is condensed by the condensing element 21, 22 and radiated onto the respective divided areas (first divided area Da1, second divided area Da2).

Figure 4B:
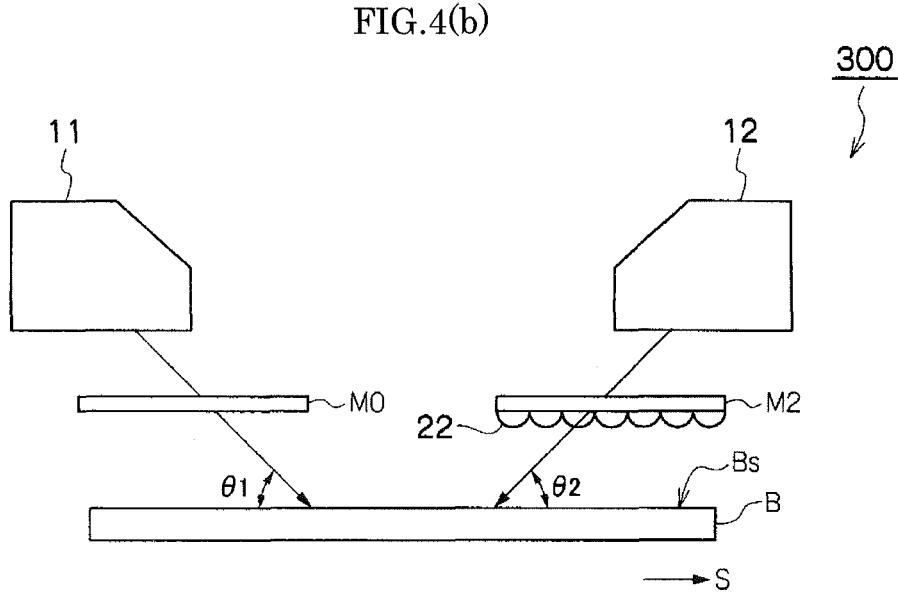

In the embodiment depicted in FIG. 4(b), a photo-alignment exposure device 300 is provided with the first exposure device 11, a first mask M0, the second exposure device 12, and the second mask M2. The condensing element 22 is provided between the second mask M2 and the exposed surface Bs. The first mask M0 serves to perform the independent proximity exposure of the first divided area Da1 which is one of the divided areas.

With the photo-alignment exposure device 300, a first exposure process is executed in which light (for example, an ultraviolet ray) is radiated at an inclined photo-irradiation angle θ1 by the first exposure device 11 onto one area (first divided area Da1) of the divided areas, and a second exposure process is executed in which light (for example, an ultraviolet ray) is radiated at an inclined photo-irradiation angle θ2 (=−θ1), which is different from the photo-irradiation angle in the first exposure process, by the second exposure device 12 onto the other divided area (the second divided area Da2). In the first exposure process and second exposure process, light is radiated respectively through the first mask M0 and the second mask M2 having the mask patterns corresponding to the respective divided areas. Further, in the second exposure process, the transmitted light of the mask pattern is condensed by the condensing element 22 and radiated onto the second divided area Da2.

In FIGS. 4(a) and 4(b), the base plate B having the unit image area Pa at the exposed surface Bs moves along the scanning direction S. The first exposure device 11 and the second exposure device 12 are disposed with a spacing from each other along the scanning direction S, and the first exposure process is performed on the upstream side in the scanning direction S, whereas the second exposure process is performed on the downstream side in the scanning direction S, in the same manner as in the example illustrated by FIG. 3. The light beams radiated by the first exposure device 11 and the second exposure device 12 are radiated in the direction along the scanning direction S at different angles (θ1, θ2) onto the exposed surface Bs.

FIG. 5 is an explanatory drawing illustrating examples of a mask and condensing element for use in the photo-alignment exposure method and photo-alignment exposure device according to one or more embodiments of the invention. In the figure, the examples of the first mask M1 and the condensing element 21 are shown, but the second mask M2 and the condensing element 22 can be formed in the same manner. However, the first mask M1 has a mask pattern corresponding to the first divided area Da1, whereas the second mask M2 has a mask pattern corresponding to the second divided area Da2.

FIG. 5(a) shows an example of the base plate B, FIG. 5(b) shows examples of the first mask M1 and the condensing element 21, and FIG. 5(c) shows other examples of the first mask M1 and the condensing element 21.

As depicted in FIG. 5(a), when the unit image areas Pa are disposed in a dot matrix configuration, a plurality of slit-shaped mask patterns (opening patterns) is formed, as shown in FIG. 5(b), in the first mask M1 corresponding thereto. In this example, each opening Ma1 is disposed on the first divided area Da1 on the exposed surface Bs, and has an opening width W1 substantially equal to that of the divided area Da1. In the slit-shaped opening pattern, a plurality of openings Ma1 is parallel to each other and disposed side by side in the direction crossing the scanning direction S.

With respect to the first mask M1, the condensing element 21 can be configured, for example, as a microlens array in which a plurality of respective single lenses 21a is disposed on the light transmission side of the openings Ma1. The condensing element 21 is not limited to this example, and a cylindrical lens (semi-cylindrical convex lens) may be individually disposed in each opening Ma1, or a lenticular lens in which a plurality of semi-cylindrical convex lenses is integrated may be used.

In the example depicted in FIG. 5(c), the openings Ma1 forming the mask pattern of the first mask M1 are disposed in a staggered manner. Each opening Ma1 is disposed above the first divided area Da1 in the same manner as in the example depicted in FIG. 5(b). By so disposing the openings Ma1 in a staggered manner, it is possible to increase comparatively the lens diameter of the single lens 21a disposed corresponding to each opening Ma1. Further, by adjusting the length of the openings Ma1 disposed in a staggered manner, it is possible to adjust, as appropriate, the lens diameter of the single lens 21a disposed correspondingly to one opening Ma1. By adjusting the lens diameter of the single lens 21a, it is possible to adjust randomly the condensing degree of the light transmitted by the mask pattern.

Figure 6A:
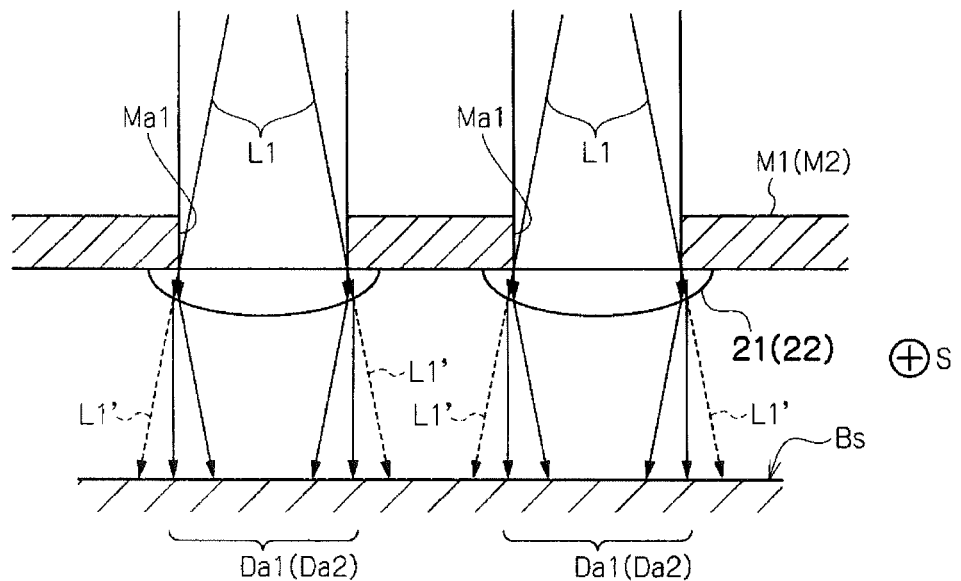
FIGS. 6(*a*) and 6(*b*) are an explanatory drawing illustrating functions of the condensing element for use in the photo-alignment exposure method and photo-alignment exposure device according to one or more embodiments of the invention.
Figure 6B:
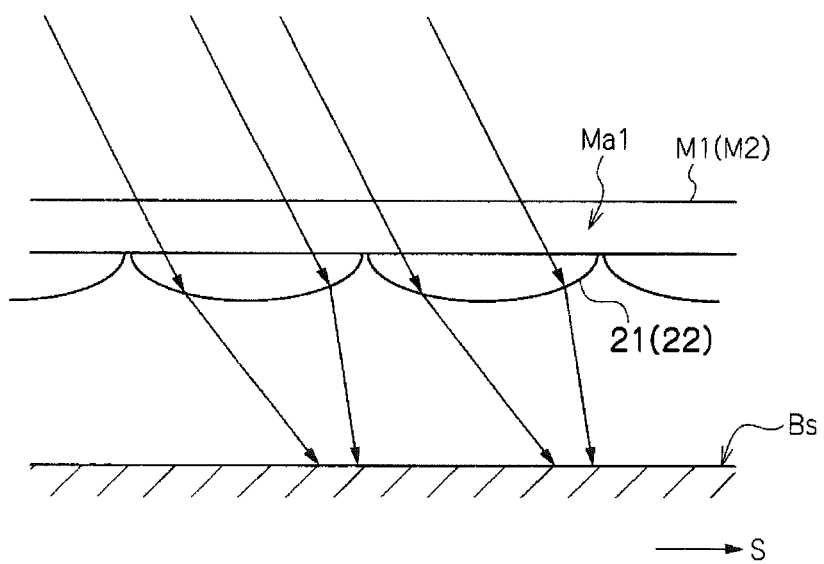

FIG. 6 is an explanatory drawing illustrating functions of the condensing element for use in the photo-alignment exposure method and photo-alignment exposure device according to one or more embodiments of the invention. FIG. 6(a) is a cross-section in the direction crossing the scanning direction S, and FIG. 6(b) is a cross section taken along the scanning direction S. The condensing element 21 (22) condenses the light passing through the mask pattern of the first mask M1 (second mask M2) on the first divided area Da1 (second divided area Da2). Thus, light L1 which is to be transmitted obliquely through the mask opening Ma1 of the first mask M1 (second mask M2) is subjected to the condensing action of the condensing element 21 (22), and light L1' straying to the outside from the first divided area Da1 (second divided area Da2) when the condensing element 21 (22) is absent can be condensed in the first divided area Da1 (second divided area Da2). Where a single lens is used as the condensing element 21 (22), the light passing through the opening Ma1 is also condensed along the scanning direction S, but since the exposed surface Bs moves along the scanning direction S, this condensing causes not exposure unevenness.

Figure 7A:
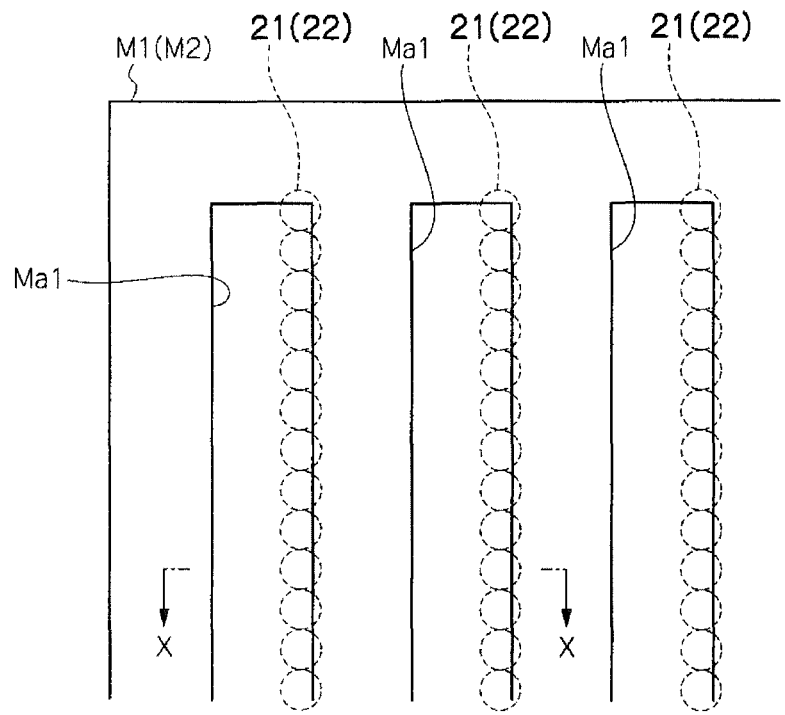
FIGS. 7(*a*) and 7(*b*) are an explanatory drawing illustrating another example of condensing element for use in the photo-alignment exposure method and photo-alignment exposure device according to one or more embodiments of the present invention.
Figure 7B:
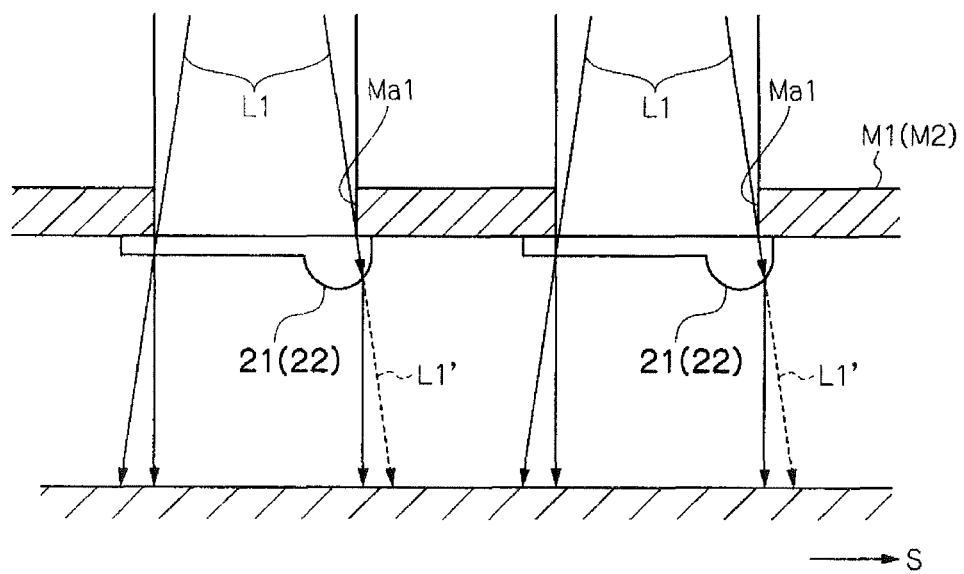

FIG. 7 is an explanatory drawing illustrating another example of condensing element for use in the photo-alignment exposure method and photo-alignment exposure device according to one or more embodiments of the invention. FIG. 7(a) is a plan view, and FIG. 7(b) is sectional view taken along X-X in FIG. 7(a). In this embodiment, the condensing element 21 (22) is provided near the edge on the dividing line DL side in the opening Ma1 of the first mask M1 (second mask M2). In the example shown in the figure, a plurality of fine single lenses is arranged along the edge of the opening Ma1. As a result, light L1 which is transmitted obliquely through the opening Ma1 of the first mask M1 (second mask M2) and attempts to cross the dividing line DL is subjected to the condensing action by the condensing element 21 (22), and light L1' straying to the outside from the first divided area Da1 (second divided area Da2) when the condensing element 21 (22) is absent can be condensed in the first divided area Da1 (second divided area Da2).

With such embodiments of the present invention, the light transmitted through the mask pattern and spreading due to the collimation half-angle is condensed by the condensing element 13, 21, 22, whereby the exposed surface Bs can be irradiated while suppressing the spread. As a result, the double-exposed area near the boundary of the divided areas Da1, Da2 can be reduced, and the alignment disorder near the boundary in the divided areas Da1, Da2 can be eliminated.

With the photo-alignment exposure method and photo-alignment exposure devices 100, 200, 300 having such features, the alignment disorder can be suppressed in the entire area in the unit image areas Pa, and the interior of the unit image areas Pa can be obtained as an area photo-aligned in one direction and an area photo-aligned in another direction. Therefore, an effective image area sufficient to narrow the unit image area Pa when the photo-alignment exposure system is used in the multi-domain method can be ensured.

The embodiments of the present invention are explained hereinabove with reference to the drawings, but the specific features are not limited to those embodiments, and design changes which do not depart from the essence of the present invention are also included in the present invention.

EXPLANATION OF REFERENCE NUMERALS 100, 200, 300: photo-alignment exposure devices,
11: first exposure device,
12: second exposure device,
13, 21, 22: condensing element, 21a: single lens,
M, M0, M1, M2: masks, Ma1: opening,
S: scanning direction, B: base plate, Bs: exposed surface,
Pa: unit image area,
DL: dividing line, Da1, Da2: divided area.

What is claimed is:

1. A photo-alignment exposure method by which each unit image area of a liquid crystal display is divided into a plurality of divided areas, and an alignment material film of each of the divided areas is photo-aligned in mutually different directions, said method comprising:
   a first exposure process that radiates light at an inclined photo-irradiation angle onto an exposed surface of the entire unit image area; and
   a second exposure process that radiates light onto one of said divided areas at an inclined photo-irradiation angle different from the photo-irradiation angle in said first exposure process, wherein
   in said second exposure process, the light is radiated through a mask pattern corresponding to one area of said divided areas, and transmitted light of said mask pattern is condensed by a condensing element disposed on each opening of the mask pattern and radiated onto said area.

2. The photo-alignment exposure method according to claim 1, wherein
   a base plate having said unit image area is moved in a scanning direction along a dividing line to divide into said divided areas, which is an arrangement direction of a plurality of said unit image areas;
   said first exposure process is performed on an upstream side in said scanning direction, and said second exposure process is performed on a downstream side in said scanning direction; and
   in said first and second exposure processes, the light is radiated in a direction along said scanning direction.

3. A photo-alignment exposure method by which each unit image area of a liquid crystal display is divided into a plurality of divided areas, and an alignment material film of each of the divided areas is photo-aligned in mutually different directions, said method comprising:
- a first exposure process that radiates light at an inclined photo-irradiation angle onto an exposed surface of one of said divided areas; and
- a second exposure process that radiates light onto an exposed surface of another of said divided areas at an inclined photo-irradiation angle different from the photo-irradiation angle in said first exposure process, wherein
- in each of said first and second exposure processes, the light is radiated through a mask pattern corresponding to each of the divided areas to be exposed, and transmitted light of each of the mask patterns is condensed by a condensing element disposed on each opening of the mask pattern and radiated onto the respective divided areas.

4. The photo-alignment exposure method according to claim 3, wherein
- a base plate having said unit image area is moved in a scanning direction along a dividing line to divide into said divided areas, which is an arrangement direction of a plurality of said unit image areas;
- said first exposure process is performed on an upstream side in said scanning direction, and said second exposure process is performed on a downstream side in said scanning direction; and
- in said first and second exposure processes, the light is radiated in a direction along said scanning direction.

5. A photo-alignment exposure method by which each unit image area of a liquid crystal display is divided into a plurality of divided areas, and an alignment material film of each of the divided areas is photo-aligned in mutually different directions, said method comprising:
- an exposure process that radiates light at an inclined photo-irradiation angle onto one area of said divided areas, wherein
- in said exposure process, the light is radiated through a mask pattern corresponding to a divided area to be exposed, and transmitted light of said mask pattern is condensed by a condensing element disposed on each opening of the mask pattern and radiated onto the divided area to be exposed.

6. A photo-alignment exposure device in which each unit image area of a liquid crystal display is divided into a plurality of divided areas, and an alignment material film of each of the divided areas is photo-aligned in mutually different directions, said device comprising:
- a mask having a mask pattern corresponding to one area of said divided areas;
- an exposure device that radiates light at an inclined photo-irradiation angle through said mask onto an exposed surface of said one area of said divided areas; and
- a condensing element that condenses transmitted light of said mask pattern and radiates the condensed light onto a divided area to be exposed,
- wherein said condensing element is disposed on each opening of said mask.

7. The photo-alignment exposure device according to claim 6, comprising:
- base plate scanning part that scans a base plate having said unit image areas along a dividing line to divide into said divided areas, which is an arrangement direction of a plurality of said unit image areas, wherein
- a plurality of said exposure devices are disposed with a spacing along a scanning direction of said base plate scanning part; and
- a plurality of said exposure devices radiate light at different angles onto the exposed surface in a direction along said scanning direction.

8. The photo-alignment exposure device according to claim 7, wherein
- said condensing element is a microlens array in which a plurality of single lenses are disposed along said mask pattern.

9. The photo-alignment exposure device according to claim 6, wherein
- said condensing element is a microlens array in which a plurality of single lenses are disposed along said mask pattern.

* * * * *